(No Model.)

B. F. LITZENBERG.
Sulky Plow.

No. 236,601.  Patented Jan. 11, 1881.

Witnesses:

Inventor:
B. F. Litzenberg

UNITED STATES PATENT OFFICE.

BENJAMIN F. LITZENBERG, OF RUSSELL, IOWA.

SULKY-PLOW.

SPECIFICATION forming part of Letters Patent No. 236,601, dated January 11, 1881.

Application filed June 23, 1880. (No model.)

*To all whom it may concern:*

Be it known that I, BENJAMIN F. LITZENBERG, of Russell, in the county of Lucas and State of Iowa, have invented certain new and useful Improvements in Sulky-Plows; and I do hereby declare that the following is a full, clear, and exact description thereof, which will enable others skilled in the art to which it appertains to make and use the same, reference being had to the accompanying drawings, which form a part of this specification.

Figure 1:
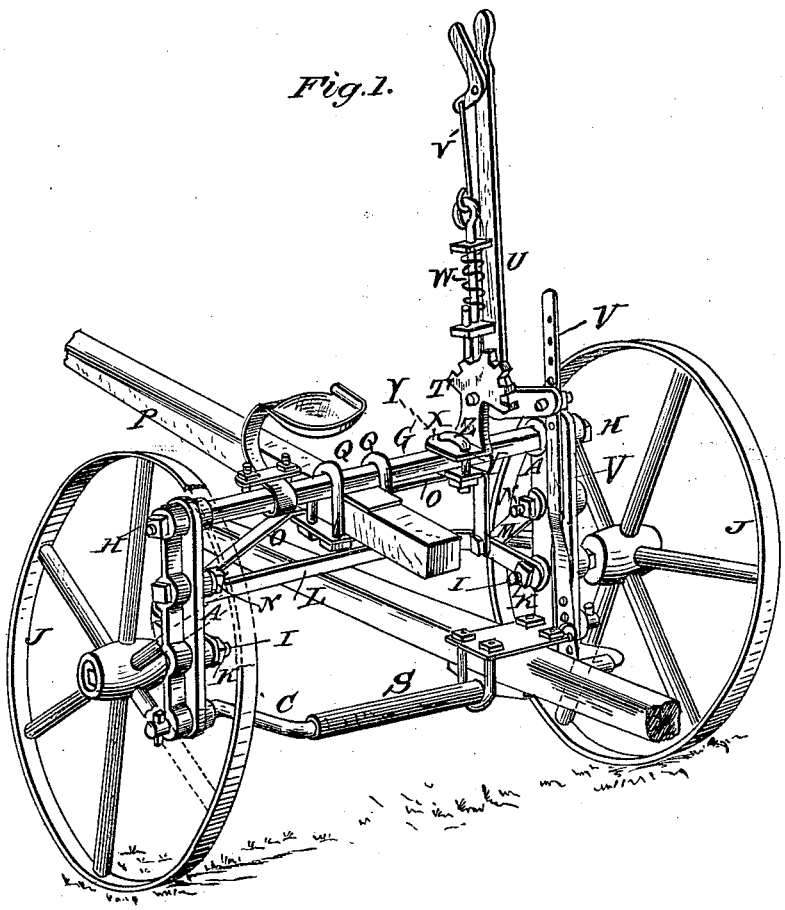
Figure 2:
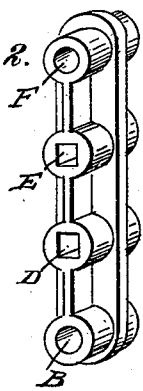
Figure 3:
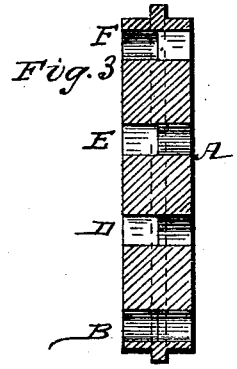

Figure 1 is a perspective view. Fig. 2 is a detail view of one of the side pieces of the frame, and Fig. 3 is a sectional view of one of the side pieces of the frame.

Corresponding parts in the several figures are denoted by like letters of reference.

This invention relates to certain new and useful improvements upon a former patent granted to me February 3, 1880, No. 224,095, for improvement in sulky-plows, having for its object the production of a plow in which the wheel-axles can be adjusted on different planes, changed to a right or left hand plow, and also to a cultivator, without shifting or reversing the side plates of the frame, as is required in my former patent, above referred to, thus enabling me to make the above-described changes with greater facility and accuracy, while at the same time simplifying the construction of the same; and to this end the invention consists in the novel constructions and combinations of parts, all as will be hereinafter fully described, and specifically pointed out in the claims.

My improved sulky-frame is composed of two side pieces, A A, made preferably of cast-iron, and provided with four equidistant, or nearly equidistant, perforations, the lower ones of which (denoted by B) are round, so as to form bearings for the ends or spindles of a bail, C, to which the plow-beam is attached, as will be hereinafter described.

The three upper perforations, D E F, are part round and part square, as shown in Fig. 3. The upper perforations, F, are connected by the cross-bar G, which is square in cross-section, so as to fit in the square part of said perforations. The ends of said cross-bar are threaded to receive the nuts H, by which it is secured.

I I are the spindles or stub-axles, carrying-wheels J J. Said stub-axles are secured in the perforations D by means of nuts K adjusted upon their inner threaded ends. The nuts K also serve to secure the bail or foot-bar L, the ends or arms of which are provided with perforations, by which it is adjusted upon the inner ends of the spindles. M M are braces extending from the forward end of the foot-bar to the perforations E, where they are secured by bolts N.

O is a bail or brace bolted to the foot-bar L and supporting the tongue P, which is secured to said bail and to the cross-bar G by means of clips Q, which admit of its being moved laterally to a proper position for a team of two, three, or more horses. Upon the cross-bar G, adjoining the tongue, is secured a spring-seat, R, for the driver.

Upon the bail C is adjusted a tube, S, to which the beam or beams of one or more plows or cultivators may be secured in the same manner as shown in my Letters Patent No. 224,095, to which reference has been made above.

To adjust the plows at any desired elevation, I avail myself of an attachment consisting of a segmental ratchet-plate, T, to the side of which is pivoted a bell-crank lever, U, having its lower short arm connected with bail C by a pivoted rod, V. The long arm of lever U has a spring-catch, W, capable of engaging any one of the notches in plate T, the lower end of which is bent at X and provided with perforations Y Y, so as to make the said plate, with its attachments, capable of being secured detachably to and laterally adjustable on the cross-bar G by means of a clip, Z.

From the foregoing description, taken in connection with the drawings hereto annexed, the operation and advantages of my invention will be readily understood.

When the frame is used for a wheel-cultivator the wheel-carrying spindles should be adjusted in the perforations D or E of the frame side pieces, thus bringing both to the same level. When a plow is used one of the spindles should be adjusted in one of the upper and the other in one of the lower perforations, according as to whether a right or left hand plow is used. The bolts N are adjusted in the perforations not occupied by the spindles.

In my former patent it is necessary to reverse the position of the side plates for forming a cultivator or in locating one of the spindles higher than the other, and to shift the position of the side plates in order to form a right or left hand plow, requiring nearly a half-hour's time in making such changes, while by my present construction I am enabled to accomplish the same result in about two or three minutes' time, and with more accuracy and reliability.

Having thus fully described my invention, I do not wish to be understood as claiming, broadly, anything shown, described, or claimed in my former patent before referred to; but I claim as my present invention—

In a sulky-plow, the frame or side pieces, A A, having four equidistant adjusting-perforations, B D E F, in combination with cross-bar G, bail C, and wheel-spindles I I, whereby said plow can be changed to a cultivator, or in locating one spindle higher than the other, or to a right or left hand plow, without reversing or shifting said side pieces, A A, in the manner herein shown and described.

In testimony that I claim the foregoing as my own I have hereto affixed my signature in presence of two witnesses.

BENJAMIN FRANKLIN LITZENBERG.

Witnesses:
JOHN CONLEY PLOTTS,
FRANK VANNICE.